Dec. 24, 1968     R. FIELDING     3,417,592
TAPER-ROLLING OF METALS
Filed March 1, 1967     9 Sheets-Sheet 1
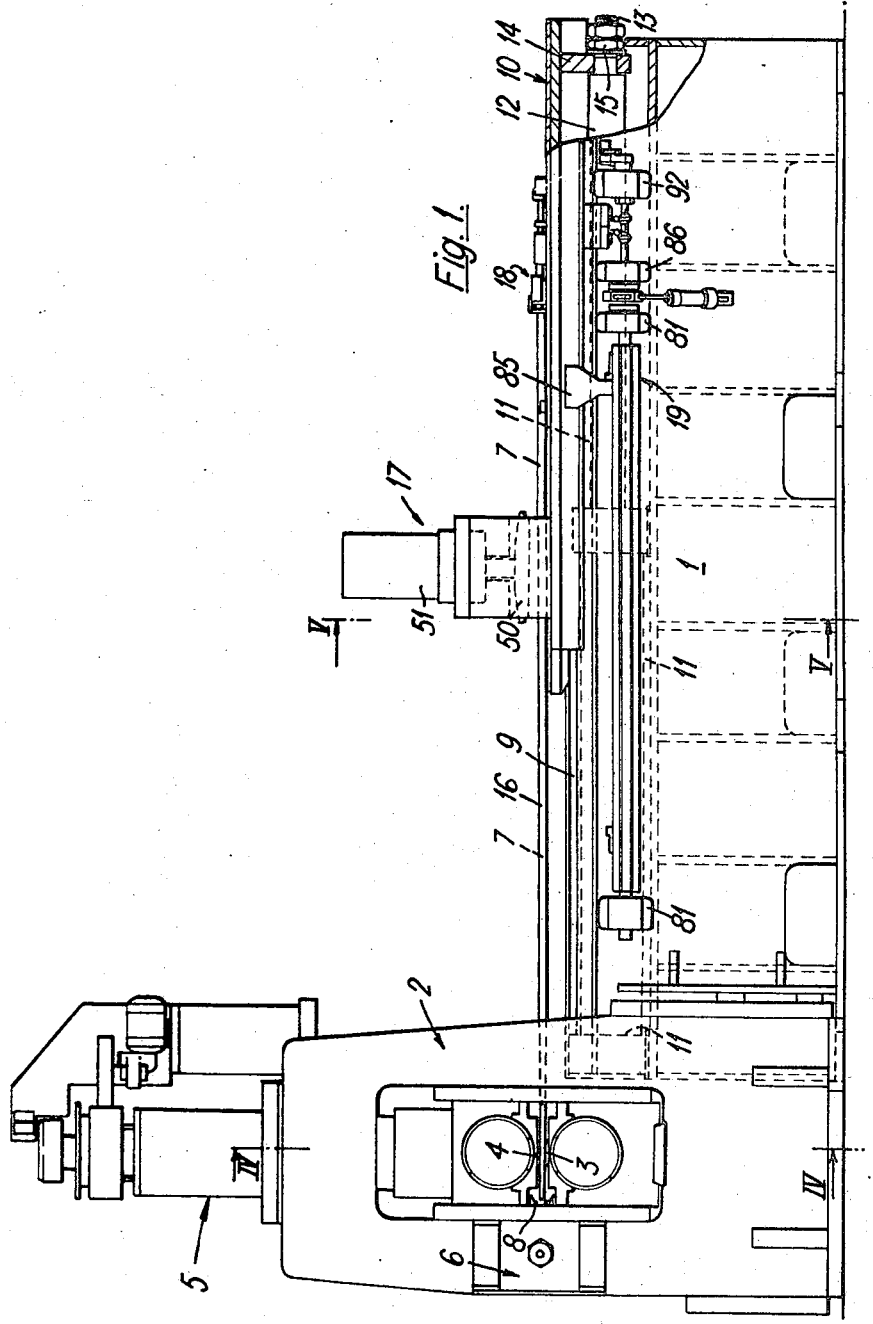
INVENTOR
Henry Fielding
BY
Watson, Cole, Grindle & Watson
ATTORNEYS

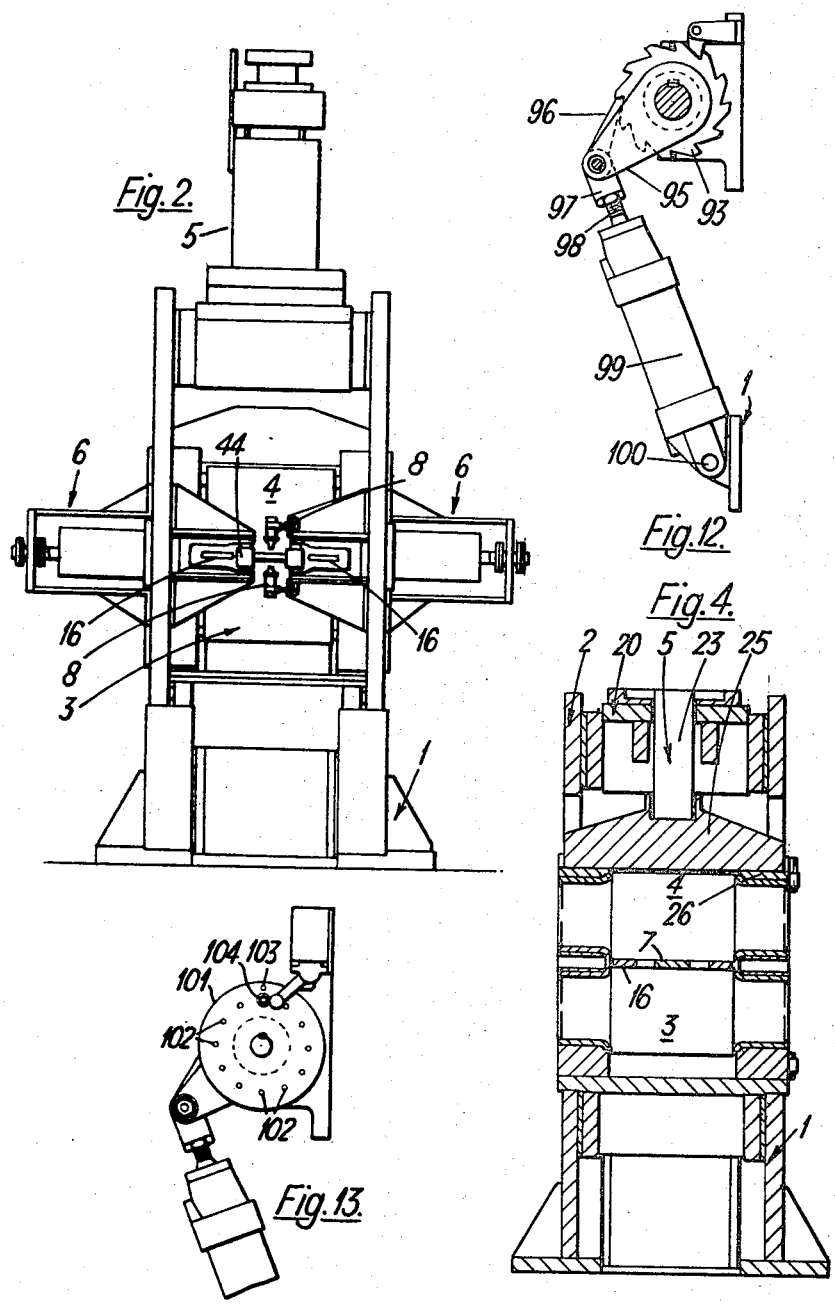

Dec. 24, 1968   R. FIELDING   3,417,592
TAPER-ROLLING OF METALS
Filed March 1, 1967   9 Sheets-Sheet 3
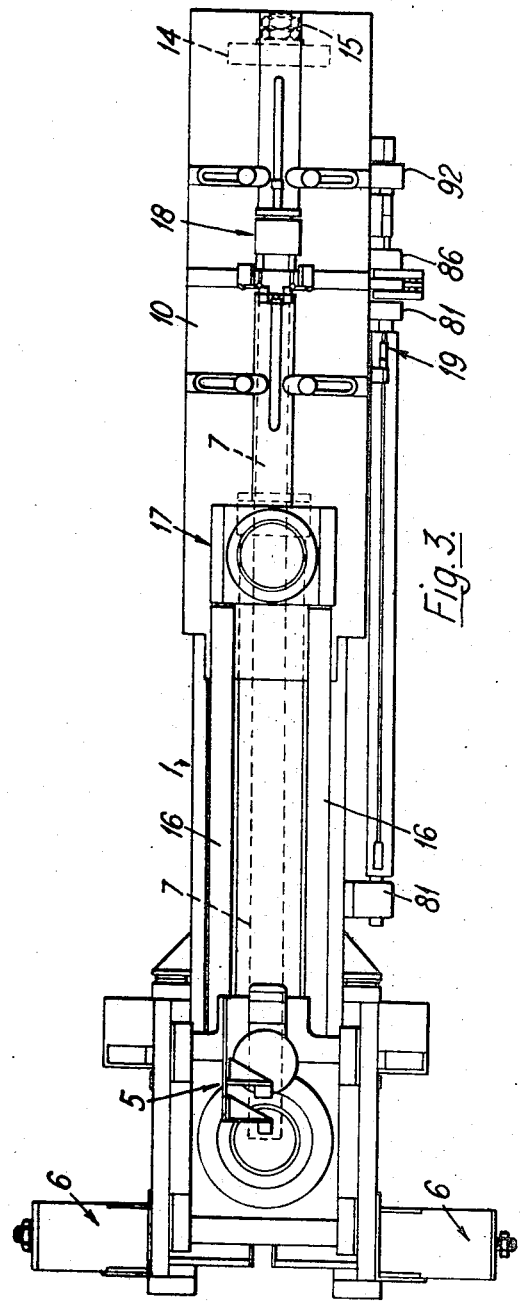
INVENTOR
Ronald Fielding
BY
Watson, Cole, Grindle & Watson
ATTORNEYS

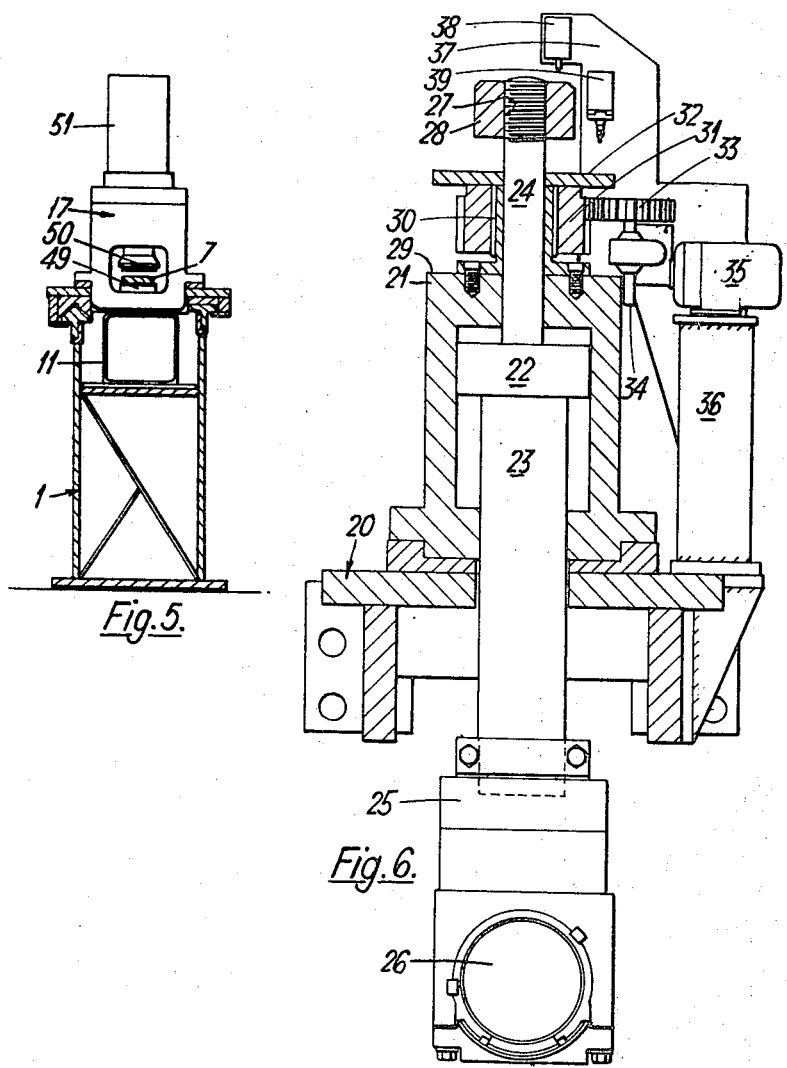

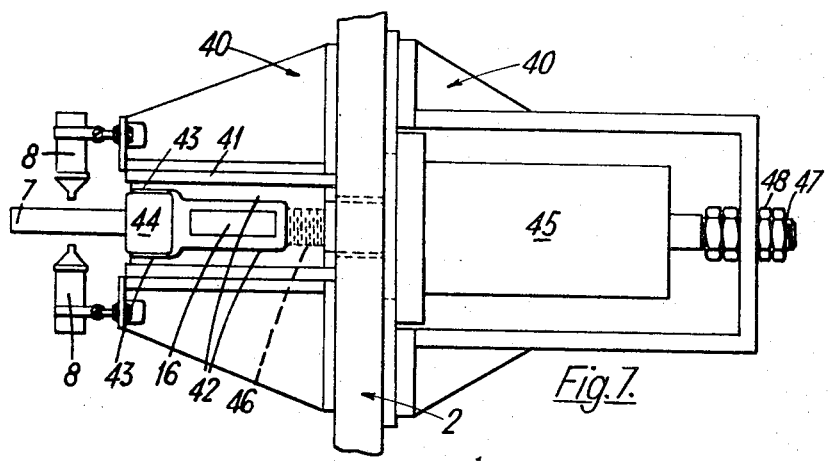
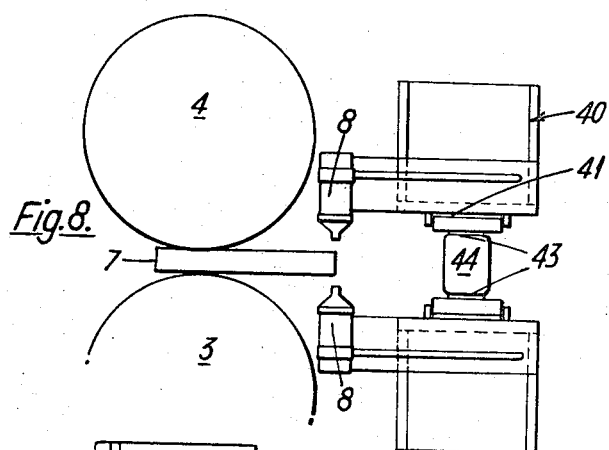
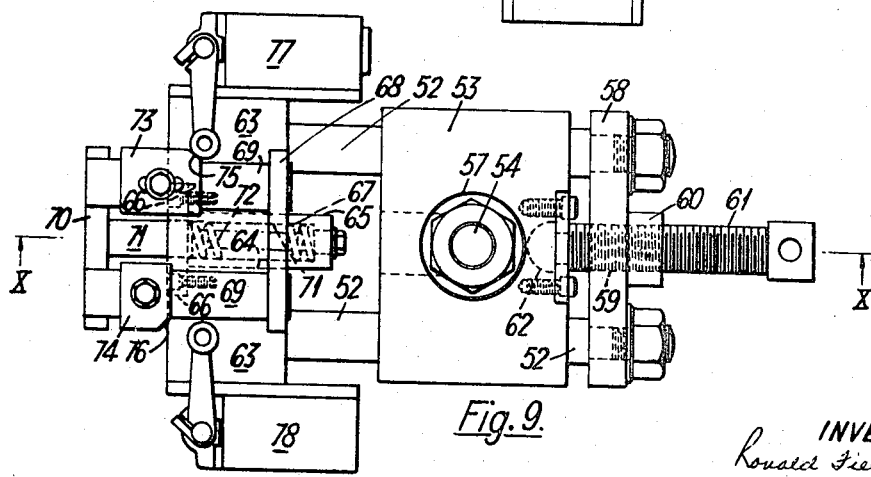

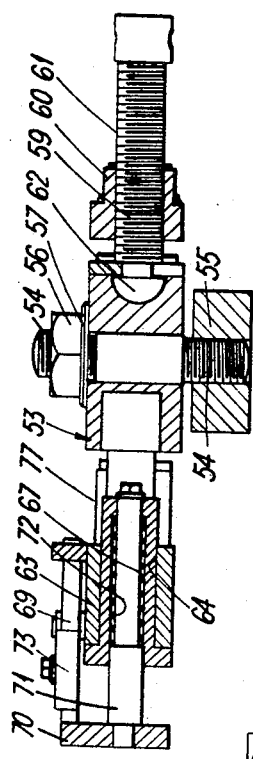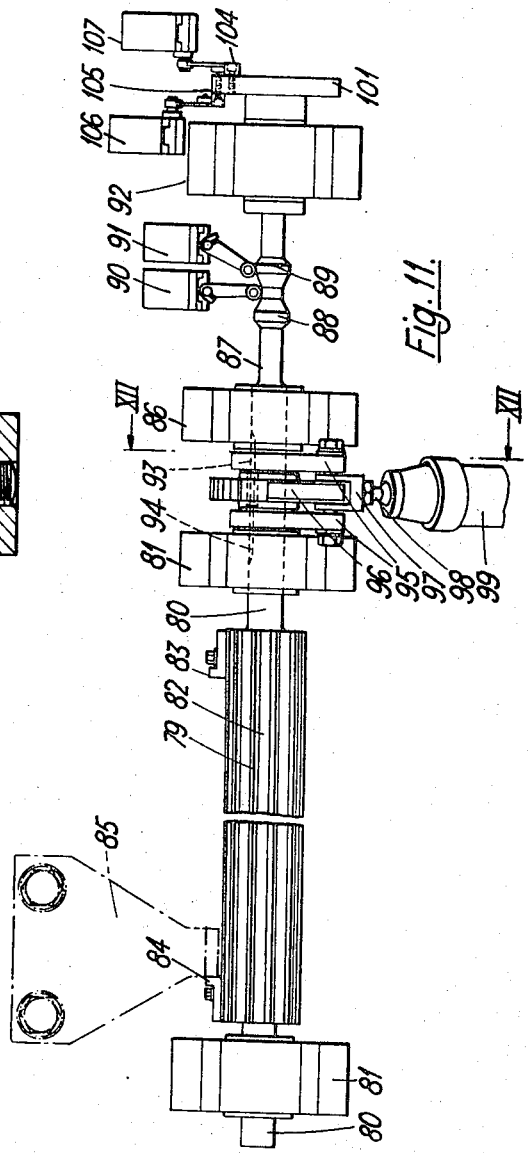

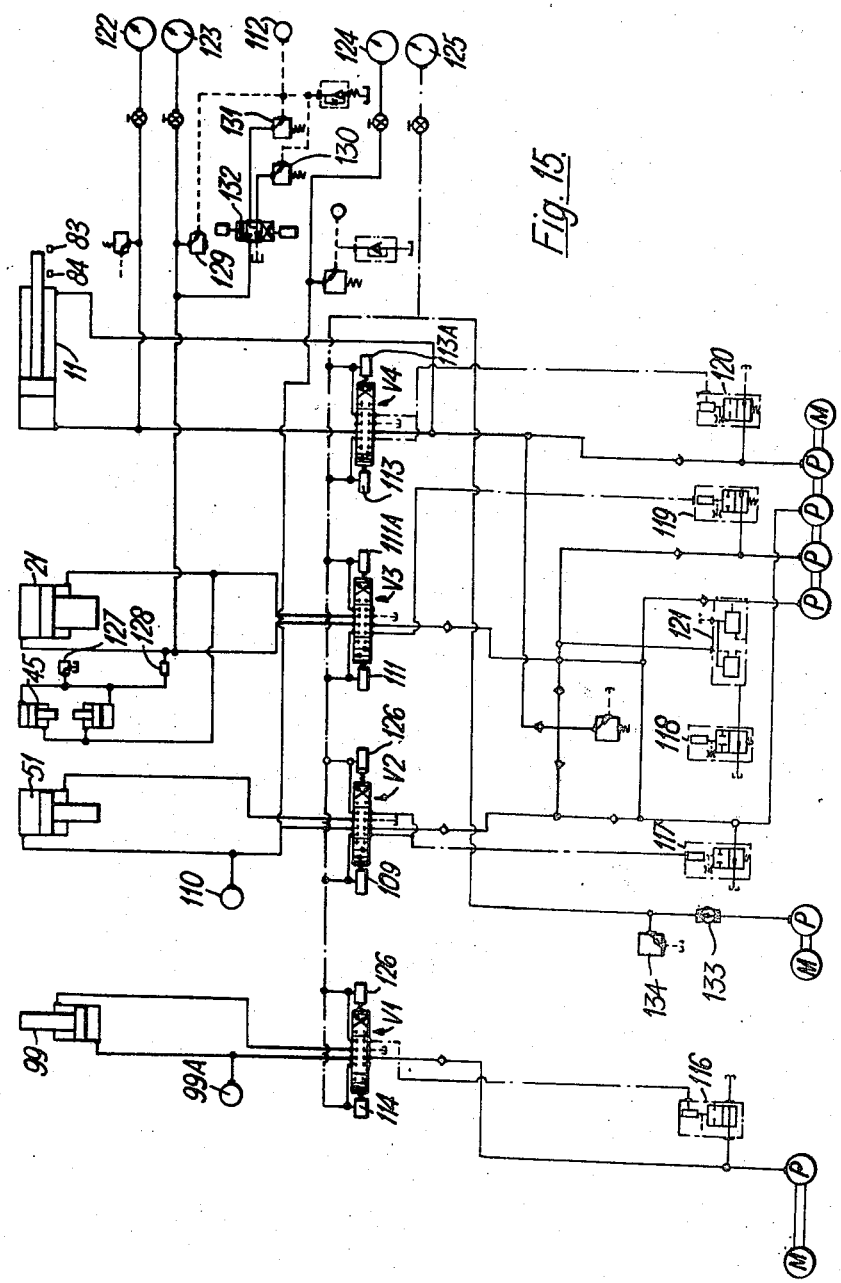

Dec. 24, 1968  R. FIELDING  3,417,592
TAPER-ROLLING OF METALS
Filed March 1, 1967  9 Sheets-Sheet 9
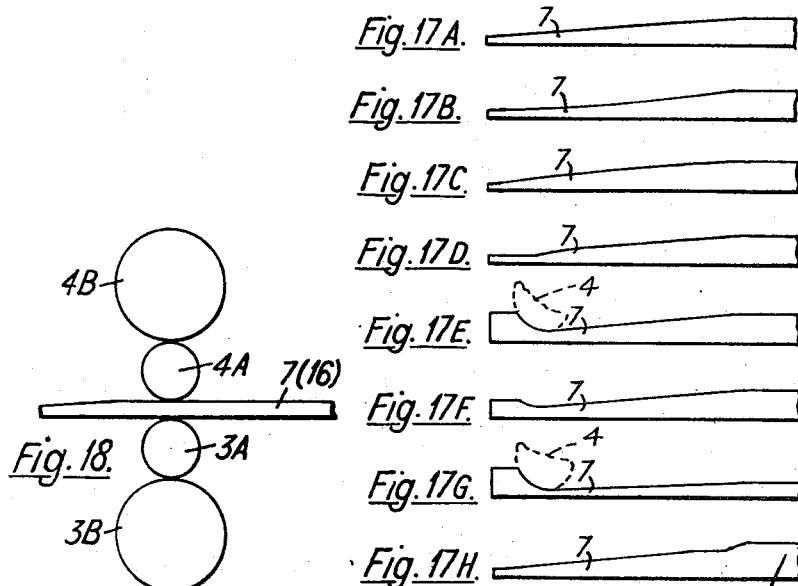
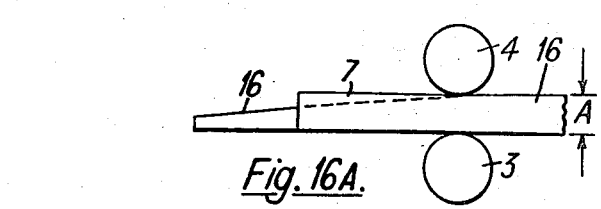
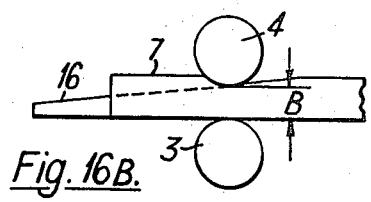
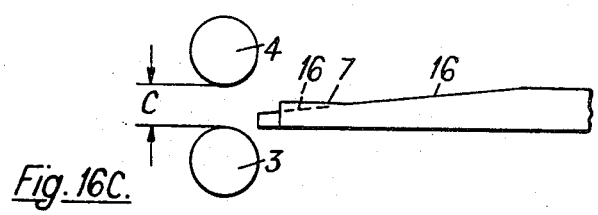
INVENTOR
Ronald Fielding
BY
Watson, Cole, Grindle + Watson
ATTORNEYS United States Patent Office 3,417,592
Patented Dec. 24, 1968

3,417,592
TAPER-ROLLING OF METALS
Ronald Fielding, Sheffield, England, assignor to
English Steel Corporation Limited
Filed Mar. 1, 1967, Ser. No. 619,851
Claims priority, application Great Britain, Mar. 4, 1966,
9,490/66
16 Claims. (Cl. 72—199)

ABSTRACT OF THE DISCLOSURE

Apparatus for and method of taper-rolling a length of metal suitable e.g., for leaf springs comprises applying lengthwise tension to the length of metal while the length is gripped between a fixed roll and a movable roll, the degree of taper being determined by tapered forming means interposed between the rolls the length of metal and forming means being drawn through the rolls and tapered by a balanced combination of drawing action and rolling action.

This invention relates to the taper-rolling of metals and is directed to the production of accurately tapered lengths of metal with close control of width.

The conventional method of taper-rolling a length of metal, heated to forging temperature, by inserting the length to be tapered between a pair of driven rolls that are appropriately profiled to produce the degree of taper required effects a spreading of the metal laterally additionally to the elongation that necessarily accompanies the formation of the taper. This necessitates either further forging to restore the length to the required width or the shearing away of the surplus material along each edge.

It is an important object of the invention to carry out taper-rolling in a manner such that any tendency to lateral spreading is virtually eliminated. A further object is to effect the rolling with exceedingly close control of the degree of taper throughout the tapered length. Still further objects and advantages will appear from the following description.

According to the present invention, a method of taper-rolling a length of metal in suitably ductile condition comprises applying lengthwise tension to the length of metal while the length is gripped transversely between a pair of rolls with sufficient pressure to effect a reduction in thickness of the metal to an extent controlled by the interposition between the rolls of forming means disposed alongside the length of metal, the forming means presenting to the surfaces of the two rolls opposite faces that are tapered in accordance with the degree of taper desired to be imparted to the length of metal, the length of metal and the forming means being secured together at the thicker end of the tapered forming means, and, concomitantly with the application of lengthwise tension to the length of metal, the gripping action of the rolls being caused to progress along the length in the direction of the thinner end of the forming means, so that the length of metal is tapered by a balanced combination of drawing action and rolling action, both arising from the applied tension.

Advantageously, the rolls are idle so that their rotation results solely from the resultant relative movement between the length of metal and the rolls in the lengthwise direction of the length, the drawing being controlled by the pressure exerted on it at the rolls and the rolling by the speed of the drawing movement, and both being dependent on the force applied lengthwise of the length to effect the drawing movement.

Because drawing action is involved in the production of the taper, the change of section imparted to the length is substantially the result of a change in thickness only, and the initial width of the length remains substantially unaltered. It is therefore possible to start with a blank having the width finally required, when the tapering is manifested as a simple elongation of the blank proportionate to the degree of taper imparted.

It is also an important advantage of the method that the reduction by simple elongation of a heated length by rolling without significant alteration of its width maintains the grain flow over the whole width of the heated length parallel to the lengthwise direction of the length.

The amount of reduction in a pass between the rolls depending upon the above-indicated balance between drawing action and rolling action, the drawing movement may be repeated as often as may be necessary to reduce the length from its original thickness to the degree of taper dictated by the formers, the balance being maintained at each pass.

To ensure simple rolling action between the rolls and the forming means, the latter should have the same thickness as the finally tapered length (with an allowance for shrinkage in the case of hot-working) and should contact parts of the roll surfaces that have the same contour as the parts that contact the heated lengths.

For the generality of metals, and particularly in the case of steels, the length of metal needs to be heated to forging temperature so that it has the ductility to partake of the combined drawing and rolling effect. For the production of a taper that necessitates a plurality of passes before the length acquires the full tapered form controlled by the forming means, the metal should be at the necessary temperature in each pass. However, it is frequently possible to carry out the plurality of passes in a single heat, as in the application of a taper to plate blanks to be transformed into leaf springs, particularly for vehicles, whether single tapered leaf springs or leaves for assembly into laminated springs, the form of the taper— straight, parabolic, or otherwise—being controlled by appropriately shaping the forming means.

As will be explained in detail below, it is also possible for the combined drawing and rolling operation as applied to the tapering of a leaf spring to be used to effect other desirable formations of the leaf at one or both ends of the tapered portion.

A taper-rolling machine according to the invention comprises a pair of rolls, elongated forming means with mutually tapered opposite faces mounted to pass through a gap between the rolls, means for effecting relative movement between the forming means and the rolls in the lengthwise direction of the forming means so that the disposition of the rolls with respect to the forming means progresses from the thicker end towards the thinner end of the forming means, means for securing one end of a length of metal to be tapered over that length against relative lengthwise movement with respect to the thicker end of the forming means, with the length disposed alongside the forming means and extending towards the thinner end of the forming means, so that the length of metal partakes of the lengthwise relative movement between the forming means and the rolls, and means for exerting gap-closing pressure at the rolls to effect a reduction in thickness of the length of metal, the reduction being progressive along the length and to an extent controlled by the thickness of the forming means alongside the length of metal and by the balanced combination of drawing action and rolling action both arising from tension applied by the means for effecting the lengthwise movement relative to the rolls.

With advantage, the rolls are idle, so that they rotate by the contact with them of the length of metal that is to be reduced in thickness by them.

Advantageously, two forming means are used, parallel to each other and spaced apart to accommodate between them the length of metal to be tapered.

Also advantageously, the pair of rolls occupy a fixed position, and a carriage to which are secured the thicker end of the or each forming means, with means on the carriage for securing one end of the length of metal to itself, is mounted to move in the lengthwise direction of the forming means, the means for effecting relative movement between the forming means and the rolls serving to move the carriage. Thus, with the carriage adjacent the rolls, while the roll gap is opened, one end of a length of metal may be passed through the roll gap and secured to the carriage, when movement of the carriage away from the rolls, after closing of the roll gap causes the length to be drawn through the gap of the rolls now caused to rotate by their frictional contact with the faces of the length as they impart taper to it.

For the production of a degree of taper that necessitates a plurality of passes, the carriage is returned towards the rolls after their gap has been opened, and then repeats its drawing movement after re-closing of the rolls into fresh gripping contact with the length of metal and the forming means.

It is convenient to use hydraulic pressure to effect both the drawing movement and the pressure-closing of the roll gap; as also to effect clamping of one end of the length to be tapered. Thus, the end to be clamped may have one face applied to a friction pad, a second friction pad being applied to its opposite face by hydraulic pressure means.

The final form of the applied taper corresponds to that of the forming means, the faces of which are followed by the rolls as they reduce the thickness of the workpiece to that of the forming means, by as many passes as may be necessary. The rolls are able to follow accurately any shape of taper, be it straight, parabolic, or otherwise. They can also "blend" either or both of the tapered faces to faces of the length beyond the tapered portion, provided the desired blending is not to a curvature less than the radius of curvature of the rolls but to obtain such less curvature a "four high" mill may be employed with the work contacting rolls of substantially smaller diameter than the backing-up rolls. Thus, the thicker end of the imparted taper may be blended into a thicker attachment portion of a leaf spring.

Again, the thinner end of the imparted taper may be blended into a thicker portion as may be desired for the formation of a shackle eye; but in this case the drawing movement in each of successive passes needs to be controlled in length, to take account of the progressive elongation from pass to pass. Thus, while only partial elongation is being effected at any pass but the last, the drawing movement must cease as the free end of the thicker portion reaches a predetermined distance from the centre of the roll gap. This can be ensured by sensing the position of the free end, as by ultrasonic, optical, magnetic, or other sensory means disposed at a corresponding predetermined position from the gap, and controlling the drawing movement in response to the sensing of the arrival of the free end. Thus, hydraulically operated drawing means may be put under the direct control of the sensing means, to ensure that, no matter how many passes are required to complete the taper, each drawing movement ceases with the requisite length of thicker end left blended to the thinner end of the taper.

It is possible for such thicker end, as for the formation of a shackle eye, to be even thicker than the attachment portion at the thicker end of the taper, because the attachment portion can be brought to a desired thickness (less than that of the initial plate blank required for the greater thickness of the shackle eye portion) by appropriate shaping of the formers.

The tapering by combined drawing and rolling may be performed on each end of a leaf extending in opposite directions (and to the same or different lengths) from a common attachment portion by first forming the tapering of one end, and then reversing the leaf for tapering of the other end (with appropriate formers and length of drawing movement if the ends are not identical).

Thickening, whether at an end (as where a shackle eye is to be formed) or elsewhere (as for the formation of an attachment portion) may be with respect to one only of the tapered faces, or with respect to both of them, and in the latter case it may be symmetrical or otherwise with respect to the neutral plane of the leaf. Where the taper (with or without any of such possible thickening) is symmetrical or substantially symmetrical with respect to the neutral plane, it is not absolutely essential that the two rolls be of the same diameter, although it is generally convenient to use rolls that are similar in that respect. However, where there is thickening at one face only, or a thickening at one face of materially different amount from a thickening at the opposite face, the roll diameters need not be identical.

The preferred hydraulic operation makes it possible for a tapering cycle to be automatically or semi-automatically controlled, with particular advantage where a plurality of passes is needed to impart the taper. Thus, the start of each drawing movement can be made contingent on the application of requisite gripping pressure at the rolls, drawing movement (which itself may be controlled in length by the sensory devices, where required in the operation), and so on until the whole of the drawing movements have been performed, as may be controlled either manually or by a cam.

In a multiple-pass operation, it is not essential for all the passes to be of the same length. Thus, an initial pass may have the rolls first grip the blank at a position towards the thinner end of the former or formers, so that the first tapering is effected on only a portion of the length of the blank towards its own free end, to be followed by one or more passes of increased length to reduce the blank progressively to the taper of the former or formers.

For an operation involving a heated blank, allowance should be made in the former-taper for the shrinkage of the tapered product on cooling. It being generally convenient for one of the rolls only to be moved with respect to the other to effect gripping of the blank, one former face should be parallel to the direction of drawing movement, to bear on the "fixed" roll, the total taper being provided by the other former face, which bears on the "gripping" roll.

Although all-hydraulic operation and control is generally advantageous, neither the method nor the apparatus of the invention is restricted as to the medium employed for operation and/or control. Thus the drawing action, the clamping, and/or the loading of the rolls could be effected by pneumatic pressure, or by mechanical or electro-mechanical means. Again, the control of the operation may be effected by solenoid-operated valves or air-operated valves, or any suitable combination of controlling devices. Thus, solenoid-operated valves are particularly suited for use with sensory devices as previously indicated, as also with limit switches responsive to completion of movements in either direction of drawing movement.

The invention will now be further described by way of example with reference to a machine utilising idle rolls shown in the accompanying drawings in which:

FIGURE 1 is a side elevation of a taper rolling machine;

FIGURE 2 is an end elevation of FIGURE 1 showing a workpiece in position;

FIGURE 3 is a plan view of FIGURE 1 but also showing a workpiece in position;

FIGURE 4 is a section on the line IV—IV of FIGURE 1;

FIGURE 5 is a section on the line V—V of FIGURE 1;

FIGURE 6 is a view, to a larger scale and partly in section of the roll control equipment for setting the work roll gap;

FIGURE 7 is a view, to a larger scale of the edge rolling equipment of the right-hand side only of FIGURE 2, and the proximity sensing device;

FIGURE 8 is an end view of FIGURE 7;

FIGURE 9 is a plan view, again to a larger scale of the adjustable stop mechanism;

FIGURE 10 is a section on the line X—X of FIGURE 9;

FIGURE 11 is a view, to a larger scale of the indexing mechanism shown in FIGURE 1;

FIGURE 12 is a section on the line XII—XII of FIGURE 11;

FIGURE 13 is a view in the direction of arrow A of FIGURE 11;

FIGURE 15 is one hydraulic circuit suitable for operating the machine substantially in accordance with FIGURE 14;

FIGURES 16A to 16C show diagrammatically the position of the bar, formers and rolls with respect to one another at various stages of operation;

FIGURES 17A to 17H show diagrammatically and to an exaggerated vertical scale various sections which may be produced with the method and apparatus; and FIGURE 18 shows an alternative roll formation which may be employed.

Figure 14:
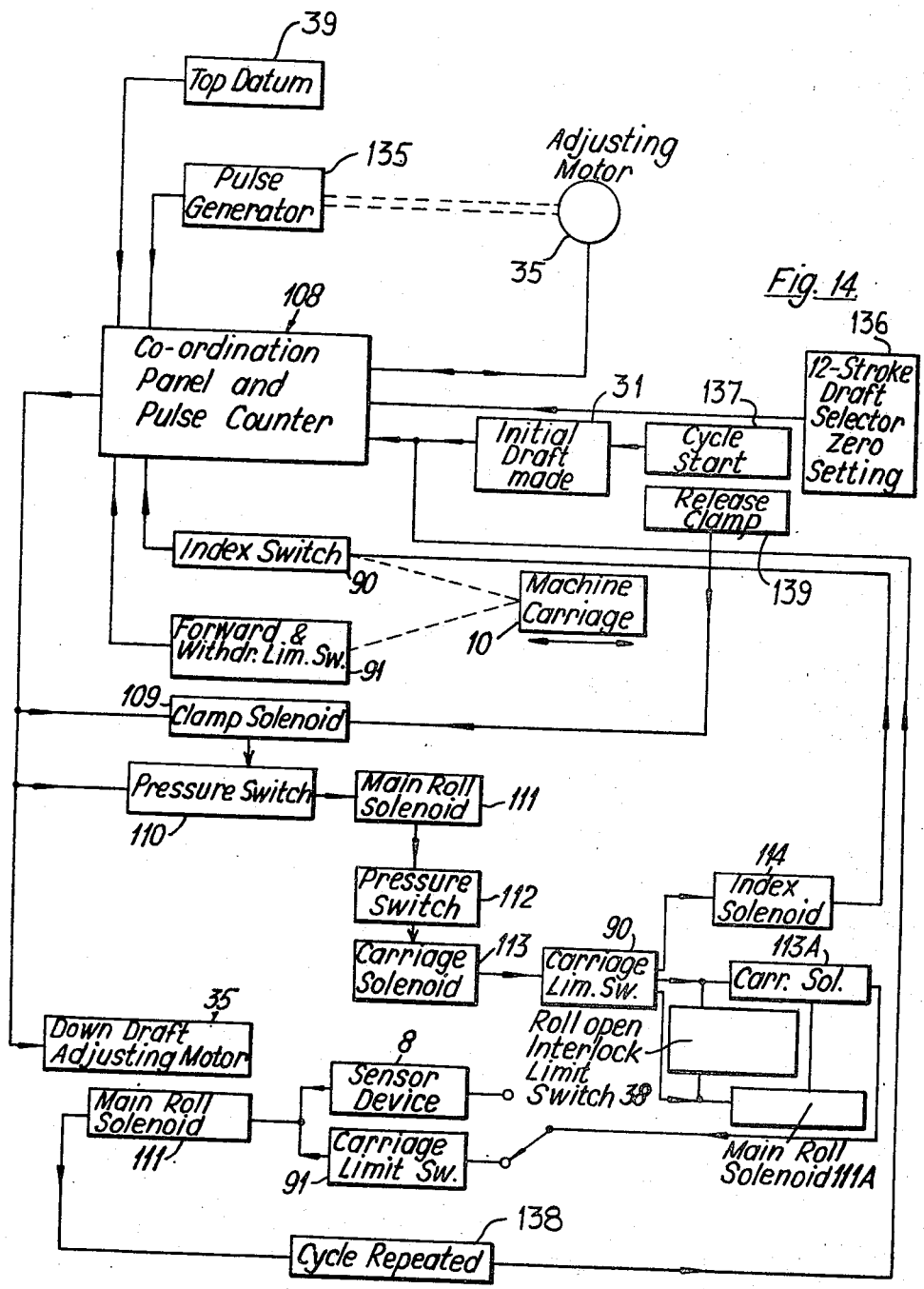
FIGURE 14 is a block diagram of an electro-mechanical hydraulic control circuit suitable for operating the apparatus.

The apparatus, as seen in FIGURES 1 to 5, consists generally of an elongated frame 1, at one end of which is secured a roll housing 2 supporting a fixed roll 3 and an adjustable roll 4 the latter being movable by roll control means 5 secured to the top of the housing 2. As can be seen in FIGURE 2, side roll devices 6 act on each side edge of a length of metal or workpiece 7 to be tapered and mounted on one side roll device 6 is a workpiece proximity sensing device 8. On the top of the frame 1 is a slideway 9 on which is slidable a carriage 10 displaced by means of a hydraulic piston and cylinder unit 11 having a piston rod 12 with a threaded portion 13 secured to a bracket 14 depending from the carriage 10 by nuts 15. To the end of the carriage nearest the work rolls and to each side of the workpiece 7 is secured a former 16 of a profile corresponding to that desired for the workpiece. A clamping device 17 is mounted towards the front end of the carriage to secure one end of the workpiece to the carriage. A stop mechanism 18 is adjustable in position over substantially the remaining portion of the carriage and against this is located the end of the workpiece 7 projecting beyond the clamping device 17. As shown in FIGURES 1 and 3, an indexing device 19 is secured to one side of the frame 1.

The roll control means 5 is shown in detail in FIGURE 6 (and partially in FIGURE 4) and comprises a base plate 20 secured to the top of the roll housing supporting on a vertical axis, a double acting hydraulic piston and cylinder unit 21, a piston rod 23, tail rod 24 the former projecting downwardly and being secured at its lowermost end to a crosshead 25 secured to bearing means for trunnions 26 of the adjustable roll 4 and the latter projecting upwardly and terminating at its uppermost end with a threaded portion 27 on which is screwed a stop nut 28 secured by screws to the top surface 29 of the cylinder 21 is a threaded sleeve 30 on which is screwed externally toothed nut 31 carrying, on its surface nearest the stop nut 26, a stop plate 32, the nut teeth meshing with pinion 33 mounted on shaft 34 driven from an electric motor 35 mounted on a base 36 extending from the base 20. A panel 37 also extends upwardly from the base 36 and carries limit switch 38 to be contacted by the stop nut 28 and switch 39 to be contacted by the stop plate 32.

The edge rolling equipment and proximity sensing device 8 are shown in detail in FIGURES 7 and 8. This equipment passes through an aperture in, and is bolted to the roll housing 2 and consists of a fabricated framework, indicated generally at 40 extending both inside and outside of the roll housing, the inside extension providing a slide means 41 for a generally C-shaped member 42 in which are secured trunnions 43 of the side roll proper 44, and the outside extension providing a housing for a hydraulic piston and cylinder unit 45 which serves, through a rod 46, to advance or retract the side roll 44 with respect to the workpiece 7, a coarse adjustment of this extension being achieved by a threaded extension rod 47 passing through the outside extension of the frame 40 and provided with lock nuts 48. The sensing devices 8 are of conventional acoustic type.

As can be seen in FIGURES 1 and 5, the clamping device 17, generally ring shaped, consists of a fixed jaw 49 and a movable jaw 50 displaced by hydraulic piston and cylinder unit 51.

The adjustable stop mechanism 18 is shown in greater detail in FIGURES 9 and 10 and comprises two parallel circular section slides 52 on which is slidably mounted a carriage 53 through which passes a bolt 54 having a T-section clamping head 55 for association with a corresponding T-section slot along the upper surface of the frame 1, a clamping nut 56 and washer 57 bearing on the upper surface of the carriage. A cross-member 58 is provided at one end of the slides 52, the member being provided with a central aperture 59 and, an axially aligned nut 60 is secured thereto through which is threaded a screw 61, terminating in a semi-cylindrical head 62 located in the carriage 53. At the other end of the slides 52 from the cross-member 58 is a cross member 63 having an aperture 64 through which passes a circular projection 65 of a plate 66 screwed to the cross-member 63 the projection 65 having a co-axial bore 67. The cross-member 63 is suitably recessed so that the plate 68 is flush. On the top surface of the cross-member 63 is mounted a transverse plate 68 suitably apertured to slidably receive the free end of each of two longtiudinally extending rectangular section slides 69 their longitudinal axes being parallel to the slides 52 and the other end of each slide 69 is secured to a transverse, downwardly extending cross-member 70 to which, in axial alignment with the bore 67 is a circular section projection 71 of such a diameter to be a sliding fit in that bore and to act on one end of a coil spring 72, the other end of which abuts the blind end of bore 67. Adjustably mounted on slide 69 is a member 73 and on the other slide 69, a member 74. Members 73, 74 are provided respectively with surfaces 75, 76 for contact respectively with arms of limit switches 77, 78, the former to slow down the rate of workpiece feed which may conveniently be effected hydraulically into the machine so as to avoid any buckling, and the latter to cause actuation of the units 51.

The indexing mechanism is shown in detail in FIGURES 11 to 13, and consists of a shaft 79 having trunnions 80 slidably secured in bearings 81. The shaft 79 is provided with twelve longitudinal T slots 82 along any of which, as desired, are secured adjustable tappets 83, 84 to be struck by a striker 85 mounted on the carriage 10. The trunnion 80 remote from the roll housing extending beyond bearing 81 to a further bearing 86 and beyond this being turned down to shaft 87 on which are formed two cam surfaces 88, 89, each associated with a limit switch 90, 91. The shaft 87 continues beyond these cam surfaces through another bearing 92 and terminates just beyond that bearing. Between the bearings 81, 86, a ratchet wheel 93 shown most clearly in FIGURE 12 is keyed in keyway 94. A link 95 is rotatably secured on the shaft between the ratchet wheel 93 and the bearings 81, 86, the ratchet wheel being rotated by a spring loaded pawl 96 secured to clevis 97, in turn secured to the piston 98 of a piston and cylinder unit 99 pivotally secured at 100 to the frame 1. On to the end of the shaft 87 beyond the bearing 92 is keyed a circular counting plate 101 provided with twelve spaced tapped holes 102 corresponding to the twelve slots 82 and a single tapped hole 103. Into one of the holes 102 is screwed a peg 104 depending on which number, from a single pass up to a maximum of twelve, is required for a particular workpiece. In the single hole is screwed a peg 105 associated with a limit switch 106, the peg 104 being associated with limit switch 107.

Having now described in detail the various aspects of the apparatus FIGURE 14 shows one convenient method of operating the apparatus although the person skilled in the art will readily appreciate that variations are possible, e.g., the initial position of the carriage may vary depending on whether manual or automatic loading of workpieces is effected. In the following description it is assumed that automatic loading is used employing hydraulic piston and cylinder means.

At the start of operations the piston and cylinder units 21, 45, 51, 11 are all retracted so that, respectively the roll gap is open, the side rolls are retracted, the clamping device is open, and the carriage is in its position of maximum approach to the rolls and formers secured in the machine according to the profile required on the finished workpiece. Depending upon the number of passes required for a particular workpiece, which in turn depends on the amount of reduction required from the original dimension, tappets 83, 84 are placed in one of the twelve slots 82. For instance, if three passes were required the tappets would be placed in the first three slots and a peg 104 in the third hole 102 with a peg 105 in the hole 103. The choice of twelve slots is arbitrary, more or less could be provided but it is believed that twelve passes would be as many as would generally be likely to be required from the machine. Also it must be decided beforehand how much reduction is to be effected at a single pass so that the nut 31 can be rotated by motor 35 through pinion 33 along the sleeve 30 an amount controlled by electronic counting equipment, that amount serving to limit the downward movement of the rolls by abutment of the underside of the nut 28 on the top surface of the adjustably positioned stop plate 32.

With the components of the machine in the above-described positions a workpiece 7 is fed by hydraulic means (not shown) through the open rolls until the stop 18 is reached, the location of the workpiece against the stop causing the surface 75 of member 73 to actuate limit switch 77, in turn to signal a reduction in the rate of the hydraulic feed means, the spring 72 absorbing further movement of the workpiece until surface 76 of member 74 actuates limit switch 78 when the signal from this switch is fed to a coordination panel and pulse counter indicated at 108 which then actuates solenoid 109 to actuate the piston and cylinder unit 51. The build-up of pressure in the unit 51 eventually actuates pressure switch 110 to operate solenoid 111 which in turn allows pressure fluid to piston and cylinder units 21, 45. The build-up of pressure in these units eventually throws pressure switch 112 which actuates solenoid 113 to allow pressure fluid to piston and cylinder unit 11. As the carriage 10 moves along the slideway 9 the rolls 3, 4 are rotated, the latter under pressure from the unit 21, rolling down the upper surfaces of the formers to impart the same contour as the formers to the workpiece, the side rolls 8 serving merely to guide and to straighten the end of the workpiece to be rolled. Eventually, the striker 85 abuts tappet 83, continued movement of the carriage forcing the shaft 79, 87 in the same direction until cam surface 88 actuates limit switch 90 to halt further movement of the carriage. Switch 90 also actuates solenoid 114 which in turn allows the extension of the piston 98 of unit 99 to rotate the ratchet wheel 96 by one notch. Switch 90 also signals solenoid 111A to actuate opening of the work rolls and side rolls and to reverse the movement of the carriage but before the carriage may be returned the stop nut 28 in its upward movement must contact limit switch 38 to complete the circuit so as to actuate the solenoid 113A to cause reverse movement of the piston rod 12 of unit 11, in turn causing reverse movement of the carriage. This reverse movement continues until striker 85 abuts tappet 84, continued movement of the carriage forcing the shaft 79, 87 in the reverse direction until cam surface 89 actuates limit switch 91 to halt further movement of the carriage. This shaft position is shown in FIGURE 11. Simultaneously switch 91 signals solenoid 111 to once again allow pressure fluid to piston and cylinder units 21, 45. The cycle as above described is then repeated as many times as set by the position of peg 104, the carriage finally finishing, by a signal from limit switch 107 actuated by peg 104, in its position of maximum approach towards the work rolls, ready for the rolled workpiece to be unloaded and the indexing device finally finishing in its start position by a signal from limit switch 106 actuated by peg 105 after the ram 99 has effected twelve indexes of the shaft, irrespective of whether or not twelve passes of the workpiece are being employed.

Other components appearing in FIGURE 14 are indicated generally as pulse generator 135 and penetration setting means 136, the cycle start being indicated at 137 and the cycle repeat at 138.

In FIGURE 15 is shown one hydraulic circuit suitable for operating the machine in the manner generally as set out in FIGURE 14. Like components appearing in other figures, have been given like reference numerals.

Three motors M are employed in the circuit each driving one or more pumps. P.

Conventional control valves V1, V2, V3 and V4 actuated by solenoid operated pilot valves 114, 126, etc. are associated respectively with the piston and cylinder units 99 of the indexing device, the piston and cylinder unit 51 of the clamping device, the piston and cylinder units 21, 45 of the main roll and side rolls, and the piston and cylinder unit 11 for carriage displacement.

With the portion of the circuit concerned with indexing piston and cylinder unit 99, pump P, when no pressure is required at the unit, pumps hydraulic fluid through pilot operated by-pass valve 116 to the reservoir tank. When that pilot is operated pressure fluid is directed to the unit 99, with the eventual actuation of pressure switch 99A, reversing the solenoid 126 action to exhaust the unit. Similar valves associated with other pumps and actuated in a similar manner are shown at 117, 118, 119 and 120, with a relief, by-pass and check valve indicated at 121.

Pressure gauges for the portion of the circuit associated with the unit 11, the units 21 and 45, the unit 51 and the pilot line are indicated at 122, 123, 124 and 125 respectively.

From left to right of FIGURE 15, the next pump P and drive motor M supply the pilot line to the four valves V1 to V4, the line including usual components such as filter 133 and pressure relief valve 134, instantly recognisable to a person skilled in the art as are other conventional components shown in FIGURE 14.

In the portion of the circuit concerned with units 45 are a relief valve 127 and reducing valve 128, to ensure that the side rolls do not exert too great a pressure on the workpiece with resultant deformation, buckling etc.

Also illustrated in FIGURE 15 is an alternative to the roll control means 5 consisting of relief valves 129, 130 and 131 set to varying pressures with a control valve 132 for selectively switching one of these three valves into the circuit to control the pressure in the piston and cylinder unit 21.

It is to be appreciated that the above-described hydraulic circuit may be modified as desired e.g., should manual loading of workpieces into the clamping device be required then at least the limit switch 77 becomes redundant and whilst the limit switch 78 may continue to control the supply of pressure fluid to the clamping device, this too may simply be replaced by a "clamp" button pressed by the operator, possibly with a further button indicated at 139 (FIGURE 14) for release of the clamping device. Also in such a modification it may be desirable to replace the ring-shaped clamping device by a C-shaped clamping device so that a workpiece may be loaded by an operator from the side of the machine rather than through the main rolls.

Thus, the bar may be taper rolled as shown in FIGURES 16A to 16C. FIGURE 16A shows diagrammatically the position of the rolls, formers and workpiece just prior to taper rolling. FIGURE 16B shows the formers and workpiece partway through the nip of the rolls. Thus it will be seen that fluid pressure on the roll 4 has altered the roll gap from distance "A" to distance "B" as the roll 4 has rolled down the formers. FIGURE 16C shows the formers, the relative increase in length of the workpiece and the rolls. It will be seen that in this pass the workpiece has not been rolled down to the same contour as the formers. This is because for this pass a final roll gap of distance "C" was selected, the gap being predetermined by the setting of the nut 31 along the sleeve 30. For a further pass the nut 31 would be brought down the sleeve 30 to obtain further penetration of the workpiece, i.e., so that distance "C" could be reduced further. For instance if it was desired to taper roll a workpiece of 1″ thickness to ½″ thickness this could be done in five passes with penetration as follows:

Pass 1—Penetration 3/16″;
Pass 2—Penetration ⅛″;
Pass 3—Penetration 3/32″;
Pass 4—Penetration 1/16″;
Pass 5—penetration 1/32″;

with the counting shaft indexed at each pass, and with peg 104 in the fifth hole from zero and with tappets 83, 84 in the first five slots from zero.

The above has dealt with a simple straight taper as illustrated in FIGURE 17A. Other tapers such as illustrated in FIGURES 17B, 17C may be effected by suitably shaping the formers, FIGURE 17D showing different degrees of taper "blended together."

It may be desirable to provide a bulbous end to a taper such as may be required for the production of a leaf spring shackle for attachment to a vehicle. This is effected by arresting movement of the carriage 10 just before the entire length of workpiece has passed through the nip of the rolls. This is shown in FIGURES 17E to 17G, the roll 4 being indicated in dotted line. In this case the control circuit is arranged so that the proximity sensing device may be manually switched in to effect stoppage of carriage traverse, rather than a limit switch, when the passage of the end of the workpiece beyond the sensing device is detected. The series of FIGURES 17A to 17H show what may be called either half a semi-elliptic leaf spring, or a quarter-elliptic leaf spring. With both these types of spring a thickened portion 7X would be incorporated in the centre of a semi-elliptic spring or at the end of a quarter-elliptic spring for the attachment of the spring to a vehicle if the complete spring was to consist of a single leaf only. If the complete spring was to consist of laminations of two or more tapered lengths then a thickened attachment portion could be produced on one or all the leaves.

If it was desired to decrease the radius of curvature of the bulbous end portions shown in FIGURES 17E, 17F and 17G then "four high" rolls could be employed, as shown in FIGURE 18, with the work contacting rolls 3A, 4A to give the required radius of curvature being of substantially smaller diameter than the backing rolls 3B, 4B.

What I claim is:

1. A method of taper-rolling a length of metal in suitably ductile condition comprising applying lengthwise tension to the length of metal while the length is gripped transversely between a pair of rolls with sufficient pressure to effect a reduction in thickness of the metal to an extent controlled by the interposition between the rolls of forming means disposed alongside the length of metal, the forming means presenting to the surfaces of the two rolls opposite faces that are tapered in accordance with the degree of taper desired to be imparted to the length of metal, the length of metal and the forming means being secured together at the thicker end of the tapered forming means, and, concomitantly with the application of lengthwise tension to the length of metal, the gripping action of the rolls being caused to progress along the length in the direction of the thinner end of the forming means, so that the length of metal is tapered by a balanced combination of drawing action and rolling action, both arising from the applied tension.

2. A method of taper-rolling a length of metal as in claim 1 wherein the rolls are idle.

3. A method of taper-rolling a length of metal as in claim 1 wherein the forming means has the same thickness as the finally tapered length and contacts parts of the roll surfaces that have the same contour as the parts that contact the lengths of metal.

4. A method of taper-rolling a length of metal as in claim 1 wherein the length of metal is heated to forging temperature so that it has the ductility to partake of the combined drawing and rolling effect.

5. A method of taper-rolling a length of metal as in claim 4, wherein a plurality of passes is effected in a single heat.

6. A method of taper-rolling a length of metal as in claim 1 wherein the drawing movement ceases as the free end of the length of metal reaches a predetermined distance from the centre of the roll gap.

7. A method of taper-rolling a length of metal as in claim 6 wherein the drawing movement ceases by sensing the position of the free end, sensory means disposed at a corresponding predetermined position from the gap, and controlling the drawing movement in response to the sensing of the arrival of the free end.

8. A method of taper-rolling a length of metal as in claim 1 wherein an initial pass has the rolls first grip the length of metal at a position towards the thinner end of the forming means so that first tapering is effected on only a portion of the length of metal towards its own free end, to be followed by at least one pass of increased length to reduce the workpiece progressively to the taper of the forming means.

9. A taper-rolling machine comprising a pair of rolls, elongated forming means with mutually tapered opposite faces mounted to pass through a gap between the rolls, means for effecting relative movement between the forming means and the rolls in the lengthwise direction of the forming means so that the disposition of the rolls with respect to the forming means progresses from the thicker end towards the thinner end of the forming means, means for securing one end of a length of metal to be tapered over that length against relative lengthwise movement with respect to the thicker end of the forming means, with the length disposed alongside the forming means and extending towards the thinner end of the forming means, so that the length of metal partakes of the lengthwise relative movement between the forming means and the rolls, and means for exerting gap-closing pressure at the rolls to effect a reduction in thickness of the length of metal, the reduction being progressive along the length and to an extent controlled by the thickness of the forming means alongside the length of metal and by the balanced combination of drawing action and rolling action both arising from tension applied by the means for effecting the lengthwise movement relative to the rolls.

10. A taper-rolling machine as in claim 9 wherein the rolls are idle.

11. A taper-rolling machine as in claim 9 wherein two forming means are used, parallel to each other and spaced apart to accommodate between them the length of metal to be tapered.

12. A taper-rolling machine as in claim 9 wherein the pair of rolls occupy a fixed position, and a carriage to which are secured the thicker end of the forming means, with means on the carriage for securing one end of the length of metal to itself, is mounted to move in the lengthwise direction of the forming means, the means for effecting relative movement between the forming means and the rolls serving to move the carriage.

13. A taper-rolling machine as in claim 9 wherein hydraulic pressure is used to effect clamping of one end of the length to be tapered, the pressure-closing of the roll gap, and the drawing movement.

14. A taper-rolling machine as in claim 9 wherein sensory means is disposed at a predetermined position from the roll gap.

15. A taper-rolling machine as in claim 9 wherein one of the rolls only is moved with respect to the other to effect gripping of the blank.

16. A taper-rolling machine as in claim 15 wherein one former face is parallel to the direction of drawing movement, to bear on the "fixed" roll, the total taper being provided by the other former face, which bears on the "gripping" roll.

References Cited
UNITED STATES PATENTS

| | | | |
|---|---|---|---|
| 2,092,188 | 9/1937 | Simons | 72—199 |
| 2,995,050 | 8/1961 | Karron et al. | 72—205 |

CHARLES W. LANHAM, *Primary Examiner.*

A. RUDERMAN, *Assistant Examiner.*

U.S. Cl. X.R.

72—205